H. A. OLSEN.
AUTOMATIC SCREW CUTTING MACHINE.
APPLICATION FILED JAN. 23, 1917.

1,287,736.

Patented Dec. 17, 1918.
2 SHEETS—SHEET 2.

Inventor:
Hans Adolf Olsen

UNITED STATES PATENT OFFICE.

HANS ADOLF OLSEN, OF SKÖIEN, NEAR CHRISTIANIA, NORWAY, ASSIGNOR TO A/S. THUNES MEKANISKE VERKSTED, OF SKÖIEN, NEAR CHRISTIANIA, NORWAY.

AUTOMATIC SCREW-CUTTING MACHINE.

1,287,736.      Specification of Letters Patent.      Patented Dec. 17, 1918.

Application filed January 23, 1917. Serial No. 143,908.

*To all whom it may concern:*

Be it known that I, HANS ADOLF OLSEN, a subject of the King of Norway, residing at Sköien, near Christiania, Norway, have invented certain new and useful Improvements in Automatic Screw-Cutting Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to screw cutting machines of the automatic type and particularly to die heads of the slidable type and with radially adjustable dies.

In screw cutting machines of this kind two or more slidable die heads are generally used in succession for cutting the full threads of a screw bolt, the first die head cutting the initial thread to a certain depth, and the following die head deepening out the same threads.

In non-automatic or semi-automatic cutting machines the same slidable die head may be used for all the successive operations, the dies being adjusted by hand after each cut.

According to the present invention this adjustment is performed automatically, whereby it is possible to construct an automatic screw cutting machine with a single slidable die head performing the several successive cuts necessary to obtain a finished thread.

Figure 1:
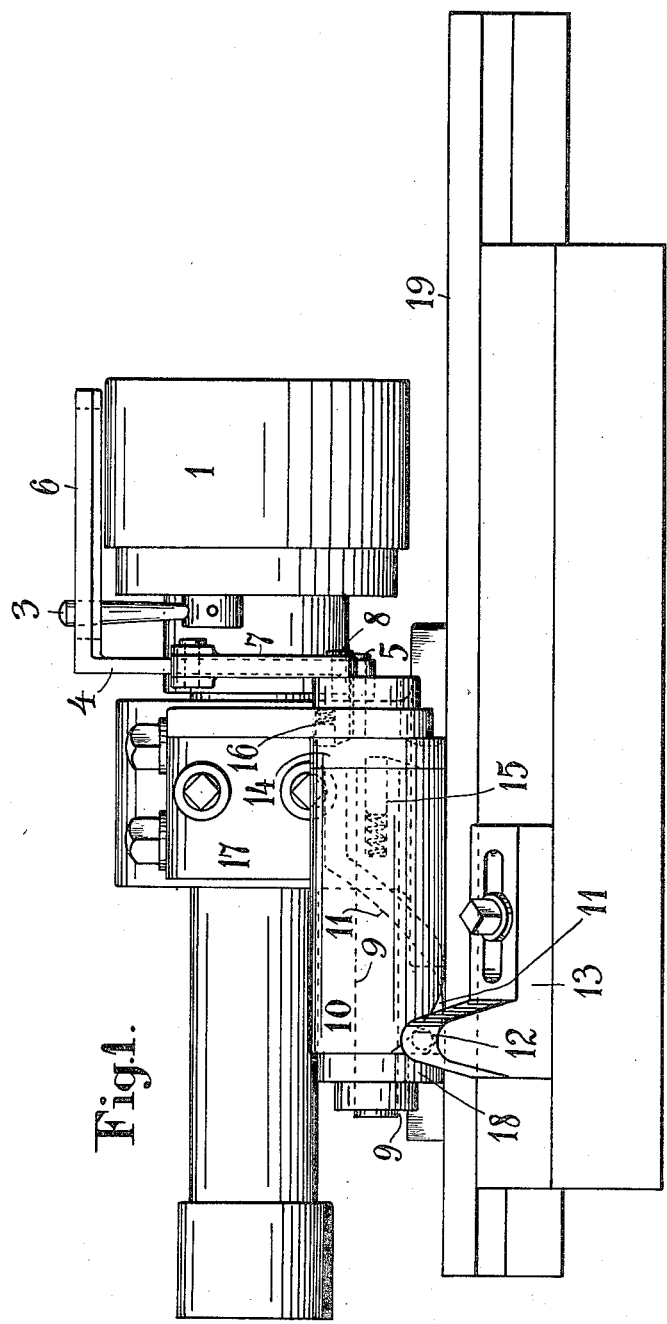
Figure 1 is a side view of an ordinary slidable die head with adjustable dies to which the present invention has been applied.
Figure 2:
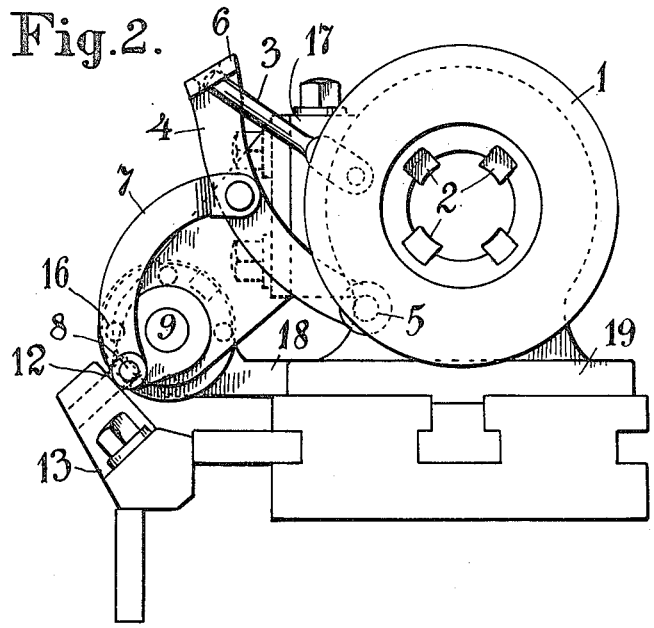
Figs. 2 and 3 are front views of the same in two different positions of the die adjusting lever.

1 is the die head, and 2 are the dies slidably mounted in radial slots in the die head and adapted to be actuated from the die-adjusting lever 3 by any suitable mechanism commonly used for this purpose. Fig. 2 shows the apparatus in the position corresponding to the initial position of the dies, and Fig. 3 shows it in the position corresponding to the last or finishing position of the dies.

The position of the lever 3 is controlled by means of guiding lever 4 pivoted at 5 and carrying a slotted guide 6 parallel to the axis of the die head 1 and sufficiently long to allow for the sliding movement thereof. This lever 4 is connected by means of link 7 with a crank pin 8 mounted on the shaft 9. Said shaft 9 also carries loosely mounted upon it a sleeve 10 into the surface of which is machined the cam slot 11 in engagement with a pin 12 mounted on the stationary bracket 13. On the shaft 9 adjacent one end of the loose sleeve 10 is fixedly mounted a coupling disk 14, which is engaged by spring actuated pawls 15 in the said sleeve on one direction of rotation and prevented from rotating the other way by means of spring actuated pawls 16 located in the bracket 17. The brackets 17, 18 carrying the shaft 9 with crank disk, crank rod, controlling lever, etc., are fastened to the die head slide 19 and follow the movements of the same, while the bracket 13 with pin 12 is mounted on the stationary frame or bed.

Figure 3:
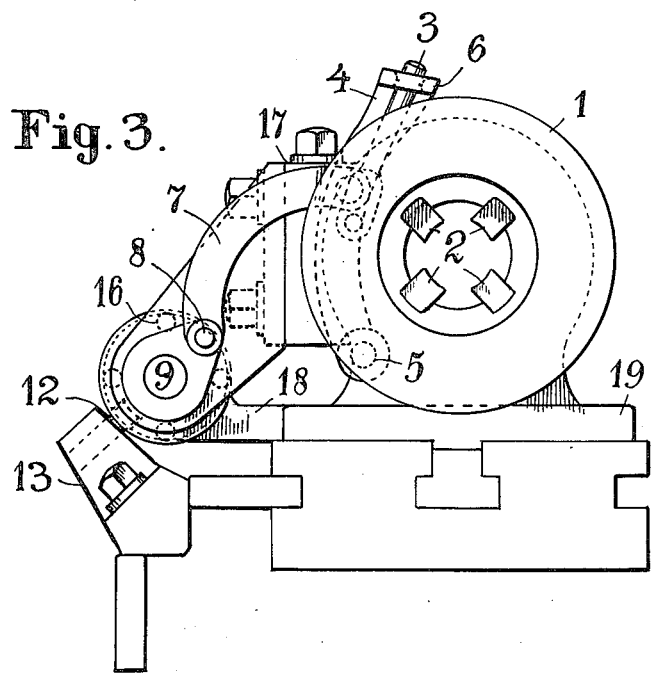

Thus by each backward movement of the die head slide the sleeve 10 will be rotated by the action of pin 12 in the cam slot 11, one half turn moving the controlling lever 4 from the position shown in Fig. 2 to the position shown in Fig. 3 and vice versa, while no movement of the controlling lever will take place during the forward or operating movement of the die head slide.

Owing to this construction the dies will alternately be in position for performing the initial cutting operation on the screw thread, and—during the next forward movement—in a position to perform the final cutting operation.

It will easily be understood that the present invention may also be applied to rotary die heads in machines where the sliding movement is performed by the blank, utilizing the relative sliding movement of the parts for effecting the alternate adjustment of the screw stocks.

Having thus described my invention, what I claim is:

1. In automatic screw cutting machines, a die head, radially adjustable dies therein, means on the die head for adjusting said dies, and means controlled by the sliding movement of the die head relatively to the blank for automatically controlling the said die adjusting means so that the dies perform a number of successively deepening cuts.

2. In automatic screw cutting machines, a die head, radially adjustable dies therein, means comprising a controlling lever on the die head for adjusting said dies, and means comprising a crank actuated link controlled by the sliding movement of the die head relatively to the blank for automatically controlling the said die controlling lever.

3. In automatic screw cutting machines, a sliding die head, radially adjustable dies therein, a lever for adjusting the dies, a crank rod actuating said lever, a crank shaft, a screw threaded sleeve loosely mounted on the crank shaft, coupling means for effecting engagement between the sleeve and the crank shaft in one direction of rotation, and a stationary pin in engagement with the thread of the sleeve for moving the dies to a new position on each backward movement of the die head.

In testimony that I claim the foregoing as my invention, I have signed my name in presence of two subscribing witnesses.

HANS ADOLF OLSEN.

Witnesses:
C. FABRICIUS HANSEN,
C. NORMAN.